United States Patent
Wang et al.

(10) Patent No.: US 8,416,421 B2
(45) Date of Patent: Apr. 9, 2013

(54) OPTICAL COHERENCE COMPUTED TOMOGRAPHY

(75) Inventors: Lihong Wang, Creve Coeur, MO (US); Li Li, Richmond Heights, MO (US)

(73) Assignee: Washington University, St. Louis, MO (US)

( * ) Notice: Subject to any disclaimer, the term of this patent is extended or adjusted under 35 U.S.C. 154(b) by 525 days.

(21) Appl. No.: 12/568,069

(22) Filed: Sep. 28, 2009

(65) Prior Publication Data

US 2010/0079768 A1    Apr. 1, 2010

Related U.S. Application Data

(60) Provisional application No. 61/101,911, filed on Oct. 1, 2008.

(51) Int. Cl.
*G01B 9/02* (2006.01)
(52) U.S. Cl. .................................. 356/479
(58) Field of Classification Search .......... 356/456, 356/479, 497
See application file for complete search history.

(56) References Cited

U.S. PATENT DOCUMENTS

| | | | | |
|---|---|---|---|---|
| 4,740,081 A * | 4/1988 | Martens et al. | ........... | 356/479 |
| 5,070,455 A | 12/1991 | Singer et al. | | |
| 5,140,463 A | 8/1992 | Yoo et al. | | |
| 5,227,912 A | 7/1993 | Ho et al. | | |
| 5,414,623 A * | 5/1995 | Lu et al. | ........... | 382/131 |
| 6,108,576 A | 8/2000 | Alfano et al. | | |
| 6,233,055 B1 * | 5/2001 | Mandella et al. | ........... | 356/479 |
| 6,956,650 B2 * | 10/2005 | Boas et al. | ........... | 356/432 |
| 2001/0052979 A1 * | 12/2001 | Treado et al. | ........... | 356/326 |
| 2002/0176092 A1 * | 11/2002 | Deck | ........... | 356/515 |
| 2003/0160967 A1 * | 8/2003 | Houston et al. | ........... | 356/501 |
| 2006/0055936 A1 * | 3/2006 | Yun et al. | ........... | 356/479 |

OTHER PUBLICATIONS

Lihong V. Wang and Hsin-I Wu, Biomedical Optics, Principles and Imaging, 2007, 7 pages, Wiley-Interscience, A John Wiley & Sons, Inc., Hoboken, New Jersey, US.
L. Wang, P. P. Ho, C. Liu, G. Zhang, R. R. Alfano, Ballistic 2-D Imaging Through Scattering Walls Using an Ultrafast Optical Kerr Gate, Science, vol. 253, 1991, pp. 769-771.
David Huang, Eric A. Swanson, Charles P. Lin, Joel S. Schuman, William G. Stinson, Warren Chang, Michael R. Hee, Thomas Flotte, Kenton Gregory, Carmen A. Puliafito, James G. Fujimoto, Optical Coherence Tomography, Science, New Series, vol. 254, No. 5035, 1991, pp. 1178-1181.
Arjun G. Yodh and David A Boas, Functional Imaging with Diffusing Light, Biomedical Photonics Handbook, 2003, Chapter 21, 45 pages, CRC Press, Boca Raton.
Li Li and Lihong V. Wang, Optical Coherence Computed Tomography, Applied Physics Letters, 2007, pp. 141107-1-141107-3, vol. 91, American Institute of Physics.

(Continued)

*Primary Examiner* — Tarifur Chowdhury
*Assistant Examiner* — Jonathon Cook
(74) *Attorney, Agent, or Firm* — Armstrong Teasdale LLP

(57) ABSTRACT

A system, method, and device for imaging a sample. In embodiments, a light from a low-coherence source or a wavelength-swept source is used to illuminate the sample. Pathlength-resolved intensity profiles of the light reemitted from the sample are recorded and measurements are taken. A reconstruction algorithm is used to invert the pathlength-resolved measurements to form an image.

8 Claims, 10 Drawing Sheets

OTHER PUBLICATIONS

A. F. Fercher, C. K. Hitzenberger, G. Kamp, S. Y. El-Zaiat, Measurement of Intraocular Distances by Backscattering Spectral Interferometry, Optics Communications, 1995, pp. 43-48, vol. 117, Elsevier Science B. V.

R. Huber, M. Wojtkowski, J. G. Fujimoto, J. Y. Jiang and A . E. Cable, Three-Dimensional and C-Mode OCT Imaging with a Compact, Frequency Swept Laser Source at 1300 nn, Optics Express 10523, 2005, pp. 10523-10526, vol. 13, No. 26, OSA.

Florian E. W. Schmidt, Martin E. Fry, Elizabeth M. C. Hillman, Jeremy C. Hebden, and David T. Delpy, A 32-Channel Time-Resolved Instrument for Medical Optical Tomography, Review of Scientific Instruments, 2000, pp. 256-265, vol. 71, No. 1, American Institute of Physics.

Jun Al and Lihong V. Wang, Spectral-Domain Optical Coherence Tomography: Removal of Autocorrelation Using an Optical Switch, Applied Physics Letters 88, 2006, pp. 111115-1-111115-3, American Institute of Physics.

Lihong Wang, Steven L. Jacques, Liqiong Zheng, MCML—Monte Carlo Modeling of Light Transport in Multi-Layered Tissues, Computer Methods and Programs in Biomedicine 47, 1995, pp. 131-146, Elsevier Science Ireland Ltd.

Subhash C. Mishra, Pranshu Chugh, Pranav Kumar and Kunal Mitra, Development and Comparison of the DTM, the DOM and the FVM Formulations for the Short-Pulse Laser Transport Through a Participating Medium, International Journal of Heat and Mass Transfer 49, 2006, pp. 1820-1832, Science Direct, Elsevier Ltd.

A. P. Gibson, J. C. Hebden and S. R. Arridge, Recent Advances in Diffuse Optical Imaging, Physics in Medicine and Biology 50, 2005, pp. R1-R43, Institute of Physics Publishing, UK.

Jeremy C. Hebden and David T. Delpy, Enhanced Time-Resolved Imaging with a Diffusion Model of Photon Transport, Optics Letters, 1994, pp. 311-313, vol. 19, No. 5, Optical Society of America.

Cosimo D'Andrea, Daniela Comelli, Antonio Pifferi, Alessandro Torricelli, Gianluca Valentini and Rinaldo Cubeddu, Time-Resolved Optical Imaging Through Turbid Media Using a Fast Data Acquisition System Based on a Gated CCD Camera, Journal of Physics 36, 2003, pp. 1675-1681, Institute of Physics Publishing, UK.

M. J. Yadlowsky, J. M. Schmitt, and R. F. Bonner, Multiple Scattering in Optical Coherence Microscopy, Applied Optics, 1995, pp. 5699-5707, vol. 34, No. 25, Optical Society of America.

Boris Karamata, Markus Laubscher, Marcel Leutenegger, Stephane Bourquin, Theo Lasser and Patrick Lambelet Multiple Scattering in Optical Coherence Tomography I Investigation and Modeling, Journal Optical Society of America, 2005, pp. 1369-1379, vol. 22, No. 7, Optical Society of America.

U. Morgner, W. Drexler, F. X. Kartner, X. D. Li, C. Pitris, E. P. Ippen, and J. G. Fujimoto,.Spectroscopic Optical Coherence Tomography, Optics Letters, 2000, pp. 111-113, vol. 25, No. 2, Optical Society of America.

Johannes F. De Boer, Barry Cense, B. Hyle Park, Mark C. Pierce, Guillermo J. Tearney and Brett E. Bouma, Improved Signal-to-Noise Ratio in Spectral-Domain Compared with Time-Domain Optical Coherence Tomography, Optics Letters, 2003, pp. 2067-2069, vol. 28, No. 21, Optical Society of America.

R. Leitgeb, C. K. Hitzenberger and A. F. Fercher, Performance of Fourier Domain vs. Time Domain Optical Coherence Tomography, Optical Express, 2003, pp. 889-894, vol. 11, No. 8, OSA.

Gang Yao and Lihong V. Wang, Monte Carlo Simulation of an Optical Coherence Tomography Signal in Homogeneous Turbid Media, Phys. Med. Biol. 44, 1999, pp. 2307-2320, IOP Publishing Ltd., UK.

Andrew Dunn and David Boas, Transport-Based Image Reconstruction in Turbid Media with Small Source-Detector Separations, Optics Letters, 2000, pp. 1777-1779, vol. 25, No. 24, Optical Society of America.

Elizabeth M. C. Hillman, David A. Boas, Anders M. Dale, and Andrew K. Dunn, Laminar Optical Tomography: Demonstration of Millimeter-Scale Depth-Resolved Imaging in Turbid Media, Optics Letters, 2004, pp. 1650-1652, vol. 29, No. 14, Optical Society of America.

Michael R. Hee, Joseph A. Izatt, Eric A. Swanson, and James G. Fujimoto, Femtosecond Transillumination Tomography in Thick Tissues, Optics Letters, 1993, pp. 1107-1109, Optical Society of America.

Subhash C. Mishra, Pranshu Chugh, Pranav Kumar and Kunal Mitra, Development and Comparison of the DTM, the DOM and the FVM Formulations for the Short-Pulse Laser Transport Through a Participating Medium, International Journal of Heat and Mass Transfer 49, 2006, pp. 1820-1832, Science Direct, Elsevier.

Rolf B. Saager and Andrew J. Berger, Direct Characterization and Removal of Interfering Absorption Trends in Two-Layer Turbid Media, J. Opt. Soc. Am. A, 2005, 1874-1882, vol. 22, No. 9, Optical Society of America.

Matthias L. Schroeter, Markus M. Bucheler, Christoph Preul, Rainer Scheid, Ole Schmiedel, Thomas Guthke and D Yves Von Cramon, Spontaneous Slow Hemodynamic Oscillations are Impaired in Cerebral Microangiopathy, Journal of Cerebral Blood Flow & Metabolism, 2005, pp. 1675-1684, ISCBFM.

Sameer A. Sheth, Masahito Nemoto, Michael Guiou, Melissa Walker, Nader Pouratian, Nathan Hageman and Arthur W. Toga, Columnar Specificity of Microvascular Oxygenation and Volume Responses: Implications for Functional Brain Mapping, Behavioral/Systems, Cognitive, The Journal of Neuroscience, 2004, pp. 634-641, vol. 24, No. 3, Society for Neuroscience.

Karin Shmueli, Peter Van Gelderen, Jacco A. De Zwart, Silvina G. Horovitz, Masaki Fukunaga, J. Martijn Jansma, and Jeff H. Duyn, Low-Frequency Fluctuations in the Cardiac Rate as a source of Variance in the Resting-State fMRI BOLD Signal, NeuroImage, 2007, pp. 306-320, vol. 38, Elsevier.

Jens Steinbrink, Arno Villringer, Florian Kempf, Daniel Haux, Stefanie Boden, Hellmuth Obrig, Illuminating the BOLD Signal: Combined fMRI-fNIRS Studies, Magnetic Resonance Imaging, 2006, pp. 495-505, vol. 24, Science Direct, Elsevier.

David C. Van Essen, PhD, Heather A. Drury, MS, James Dickson, MS, John Harwell, MS, Donna Hanlon, MS, Charles H. Anderson, PhD, An Integrated Software Suite for Surface-Based Analyses of Cerebral Cortex, Journal of the American Medical Informatics Association, 2001, pp. 443-459, vol. 8, No. 5, group.bmj.com.

Arjun Yodh and Britton Chance, Spectroscopy and Imaging with Diffusing Light, Physics Today, 1995, pp. 34-40, American Institute of Physics.

Benjamin W. Zeff, Brian R. White, Hamid Dehghani, Bradley L. Schlaggar and Joseph P. Culver, Retinotopic Mapping of Adult Human Visual Cortex with High-Density Diffuse Optical Tomorgraphy, Proceedings of the National Academy of Sciences, 2007, pp. 12169-12174, vol. 104, No. 29, PNAS, USA.

Dongyang Zhang, Abraham Z. Snyder, Michael D. Fox, Mark W. Sansbury, Joshua S. Shimony, and Marcus E. Raichle, Intrinsic Functional Relations Between Human Cerebral Cortex and Thalamus, J Neurophysiol, 2008, p. 1740-1748, vol. 100, The American Physiological Society.

Ping Zou, Raymond K. Mulher, Robert W. Butler, Chin-Shang Li, James W. Langston and Robert J. Ogg, BOLD Response to Visual Stimulation in Survivors of Childhood Cancer, NeuroImage, 2005, pp. 61-69, vol. 24, Science Direct, Elsevier, Inc.

* cited by examiner

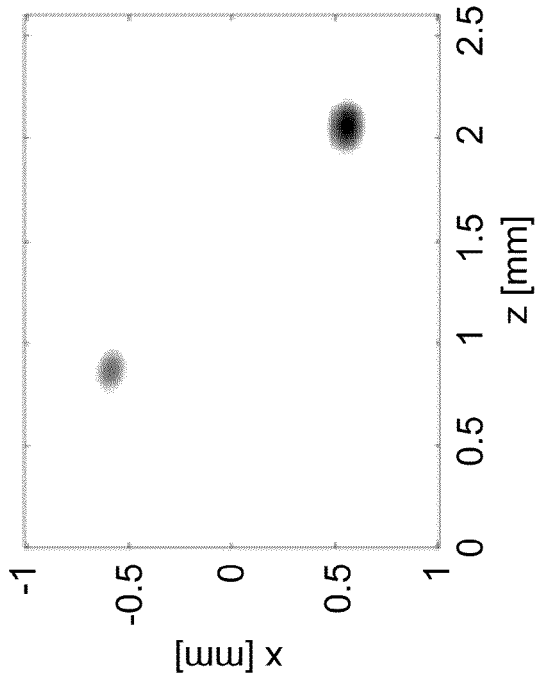
FIG. 6B
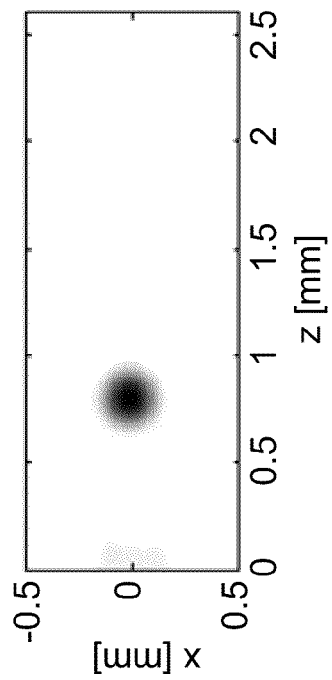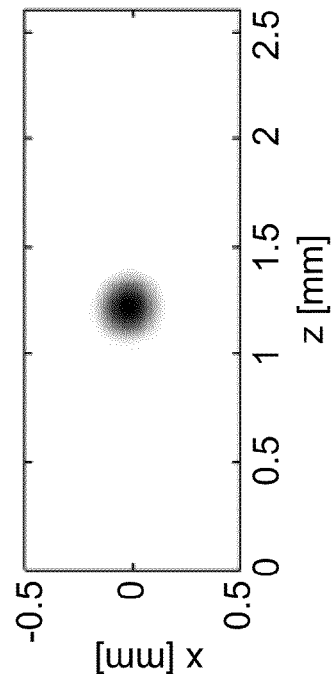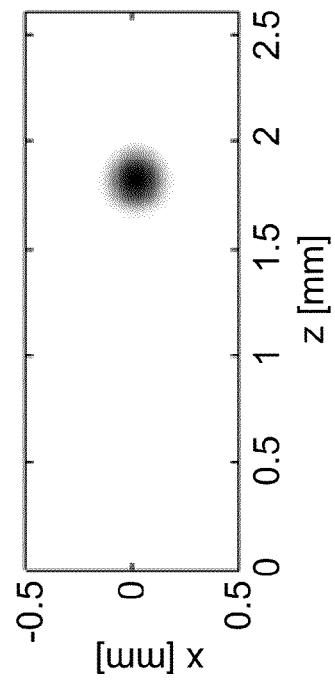
FIG. 6A

OPTICAL COHERENCE COMPUTED TOMOGRAPHY

CROSS REFERENCE TO RELATED APPLICATION

This application claims the benefit of U.S. Provisional Patent Application No. 61/101,911 filed Oct. 1, 2008, which is hereby incorporated by reference in its entirety.

STATEMENT REGARDING FEDERALLY SPONSORED RESEARCH & DEVELOPMENT

This invention was made with government support under grant R01 CA092415 awarded by the U.S. National Institutes of Health. The government has certain rights in the invention.

BACKGROUND

Imaging techniques play a key role in biomedical studies and clinical practice. Compared with other imaging modalities, optical methods possess several significant merits. Optical methods utilize non-ionizing and safe radiation to investigate tissue, and thus are especially suitable for screening and monitoring applications. Optical tools are also capable of providing various imaging contrasts, and therefore are versatile in visualizing different structures, physiological functions, and molecule-specific events. For example, blood strongly absorbs light; therefore, morphology of blood vasculature can be readily mapped by optical systems that exploit absorptions contrast. The difference in the absorption spectra of different hemoglobin molecules can be further exploited to evaluate an oxygen saturation level of blood. Also, blood flow can be quantified using optical frequency shifts of scattered light based on the Doppler effect. Further, when commercialized, optical systems can potentially be made compact, portable and inexpensive.

Most current optical imaging techniques can be classified into two groups. The first group, known as ballistic imaging, works in the ballistic regime. It includes early-photon imaging, confocal microscopy, and optical coherence tomography. These modalities rely on unscattered or singly backscattered photons, which are selectively collected using gating techniques based on time-of-flight, spatial collimation or coherence. Although exclusive use of ballistic photons assures high-resolution imaging, ballistic photons attenuate exponentially with penetration. As a result, imaging depth of ballistic imaging is limited to less than approximately 1.0 millimeters (mm) in highly scattering tissue, such as skin.

The second group works in a diffusive regime, and mainly includes diffuse optical tomography. Diffuse optical tomography measures diffused light reemitted from tissue through multiple source-detector pairs. An algorithm, based on a photon propagation model, is adopted to invert measurements to form a spatial map of tissue's optical properties. However, although use of diffused light allows diffuse optical tomography to visualize several centimeters deep inside turbid tissue, achieved spatial resolution is poor, typically about a fraction of a centimeter, as a result of the nature of photon diffusion.

As described above, development of optical imaging faces a major challenge, namely that turbid media, like biological tissue, strongly scatters light. Unlike X-ray photons, optical photons can penetrate approximately 1.0 mm (typical transport mean free path for biological tissue) into biological tissue, and still mostly maintain their original directions. This penetration range is called the ballistic regime. After traveling approximately 1.0 centimeters (cm) inside tissue, photons almost completely lose their memory of their original incidence direction after a large number of scattering events, and enter the so-called diffusive regime. The quasidiffusive regime (between approximately 1.0 mm and approximately 1.0 cm inside tissue) refers to the transition region between the two, where photons experience multiple scattering events and retain only a weak memory of their original directions.

SUMMARY

The present disclosure combines a low-coherence interferometer that measures pathlength-resolved intensity profiles of reemitted light from a sample through a plurality of illumination-detection position pairs and a model-based reconstruction algorithm that inverts the pathlength-resolved measurements to form an image of tissue.

BRIEF DESCRIPTION OF THE DRAWINGS

The present disclosure is described in detail below with reference to the attached drawing figures.

FIG. 6A illustrates an image of a horse hair fiber embedded in a highly-scattering medium obtained according to embodiments of the present disclosure.

FIG. 6B illustrates an image of two horse hair fibers embedded in a highly-scattering medium obtained according to embodiments of the present disclosure.

DETAILED DESCRIPTION

The present disclosure provides various technical advantages over conventional techniques in imaging turbid media. For example, the present disclosure makes full use of multiple-scattered photons, as well as ballistic photons. Therefore, the methods and systems described herein image deeper than ballistic imaging inside highly scattering tissue. Further, reemitted light can be measured at a pathlength resolution as small as several micrometers, which is equivalent to a femtosecond-scale temporal resolution. Such a fine temporal resolution has not been achieved by traditional time-resolved detection systems, which are also much more costly. The methods and systems described herein allow better distinction between different photon trajectories in tissue, hence improving not only spatial resolution, but also localization accuracy and robustness of reconstruction. The systems and methods of the present disclosure can work in a quasidiffusive regime, where both ballistic imaging and diffuse optical tomography fail to work. For example, embodiments of the present disclosure can image beyond 1.0 mm into highly scattering media with spatial resolution higher than diffuse optical tomography. Further, other technical advantages may be apparent to one of ordinary skill in the art.

Figure 1:
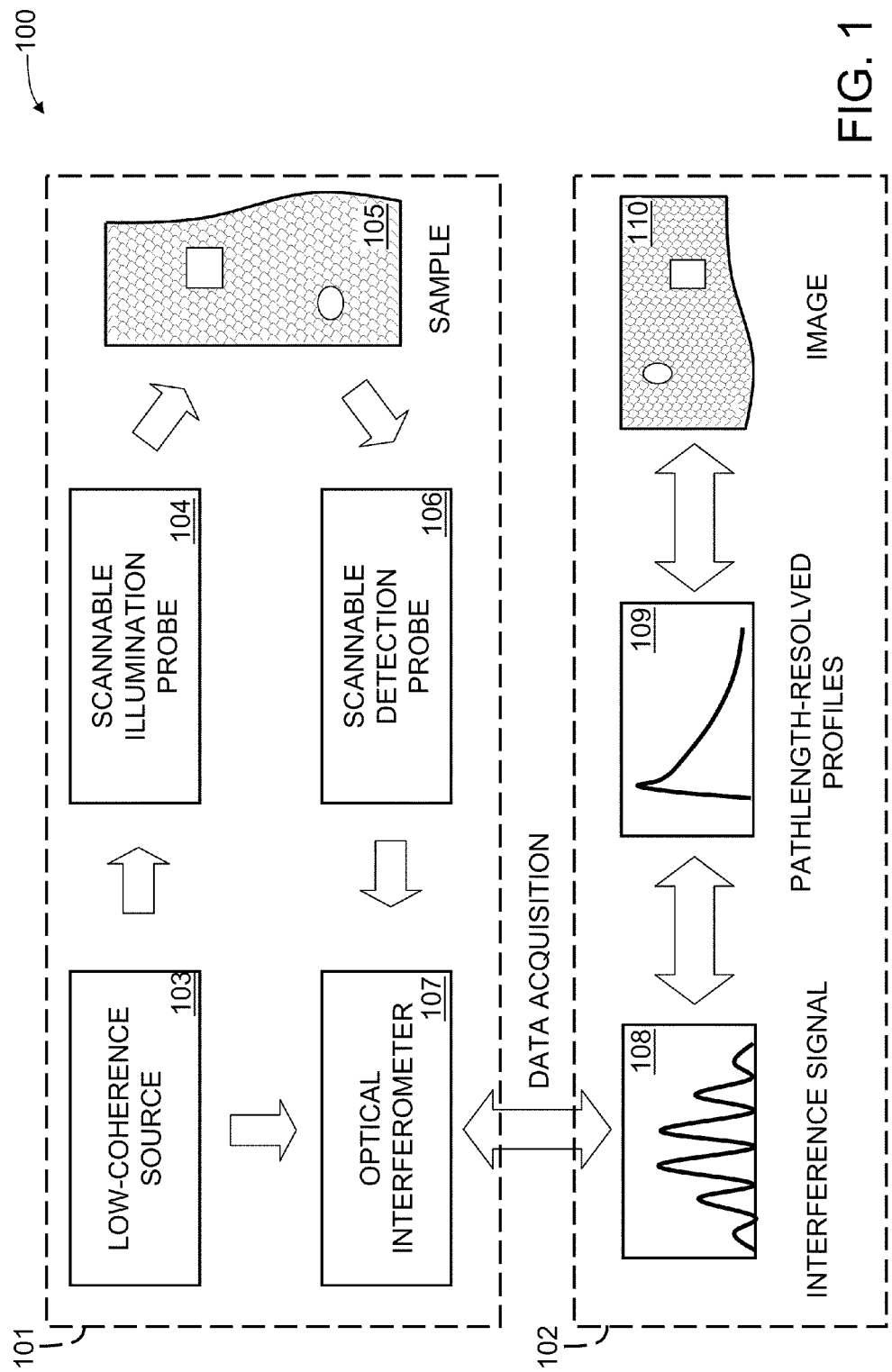
FIG. 1 illustrates a general block diagram of a system according to embodiments of the present disclosure.

Referring initially to FIG. 1, a general block diagram of a system is illustrated according to embodiments of the present disclosure. An optical coherence computed tomography system 100 includes a low-coherence interferometer unit 101 and an image formation unit 102. The low-coherence interferometer 101 measures pathlength-resolved intensity of reemitted light. In embodiments, the low-coherence interferometer 101 includes a low-coherence light source 103 configured to provide light with short coherence length to seed the low-coherence interferometer unit 101 and an illumination probe 104 configured to deliver light to a surface of a sample 105. The low-coherence interferometer 101 further includes a detection probe 106 configured to collect light reemitted from the surface of the sample 105 and an optical interferometer 107 configured to mix a portion of the light directly from a source, for example the low coherence light source 103, and the reemitted light from the sample 105 to produce an interference signal 108. In embodiments, both the illumination probe 104 and the detection probe 106 are mounted on translation stages. In further embodiments, the illumination probe 104 and the detection probe 106 are integrated into one probe. For illumination at each location on the sample 105, reemission from different locations may be measured by scanning the detection probe 106. Measurements are repeated for different illumination locations on the surface of the sample 105 by scanning the illumination probe 104. The interference signal is then digitized and stored in a computer, where the measurements are inverted to form an image.

In embodiments, an image formation process includes the steps of: 1) converting the interference signal 108 into pathlength-resolved intensity curves 109, and 2) using a model-based reconstruction algorithm to invert measurements of time-resolved reemission intensity 109 to form an image 110, which represents spatial distribution of optical properties of the sample.

Figure 2:
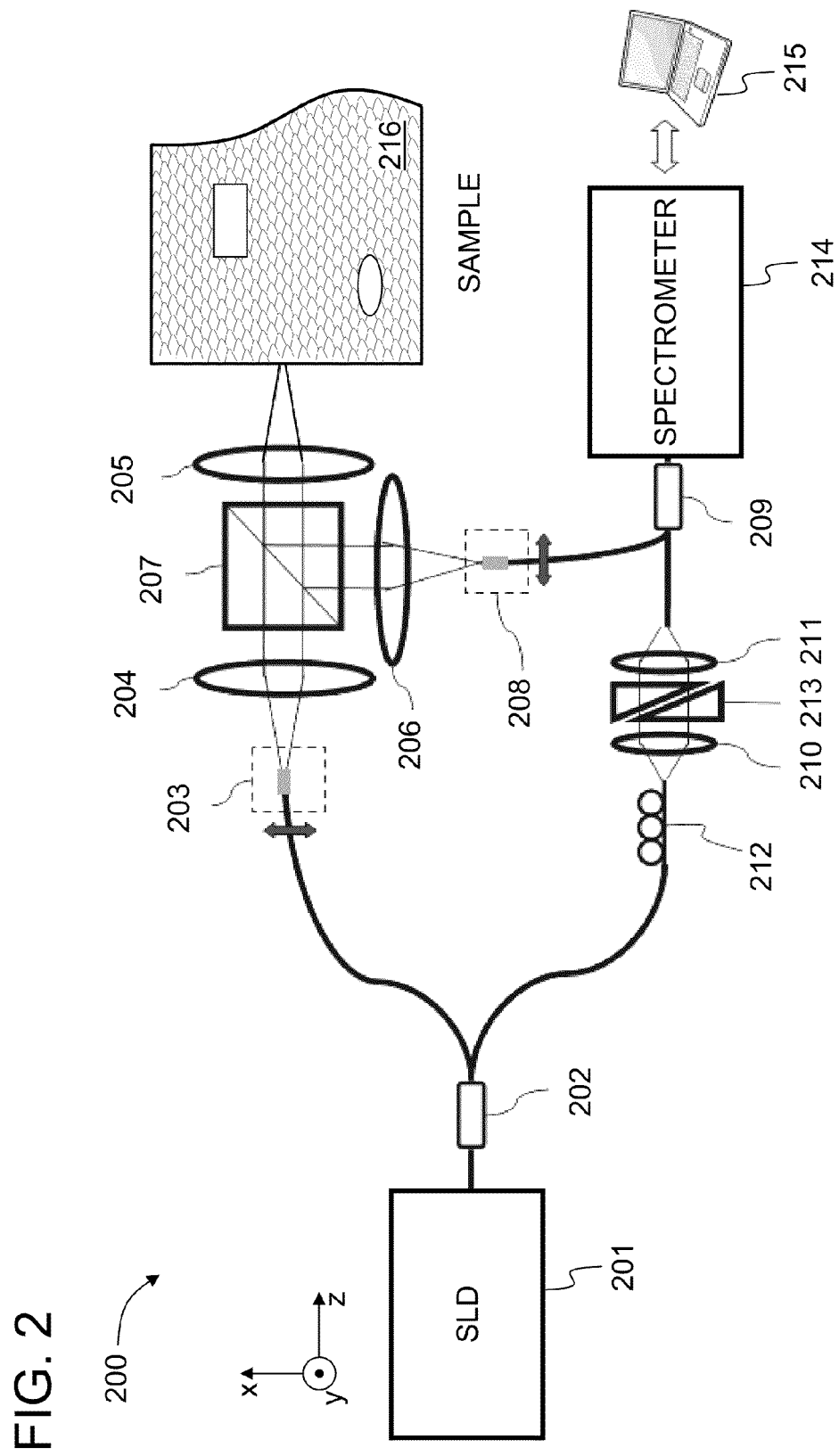
FIG. 2 illustrates a schematic diagram of a reflection-mode system according to embodiments of the present disclosure.
Figure 3:
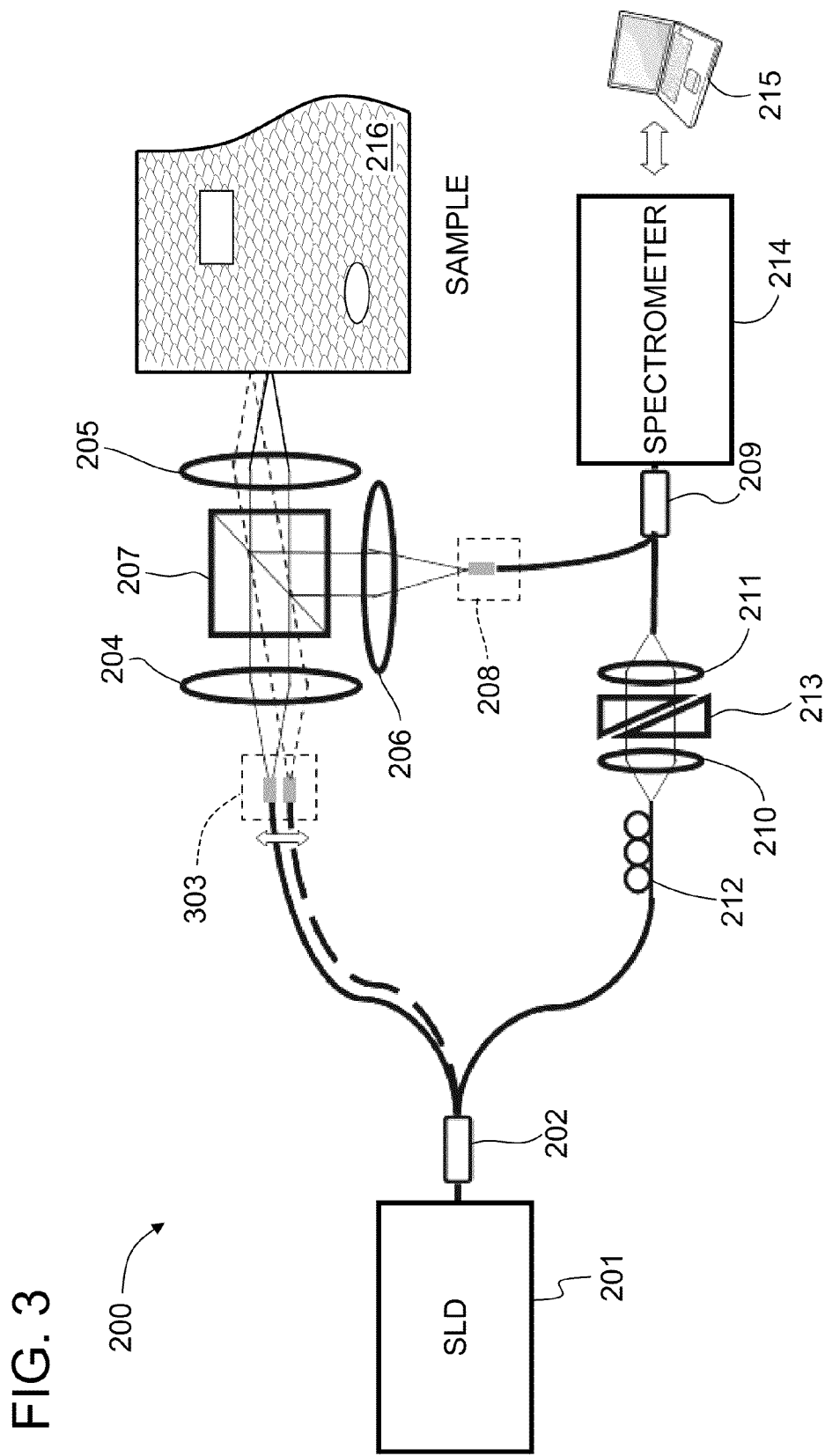
FIG. 3 illustrates a schematic diagram of a reflection-mode system illuminating various locations on a sample according to embodiments of the present disclosure.
Figure 4:
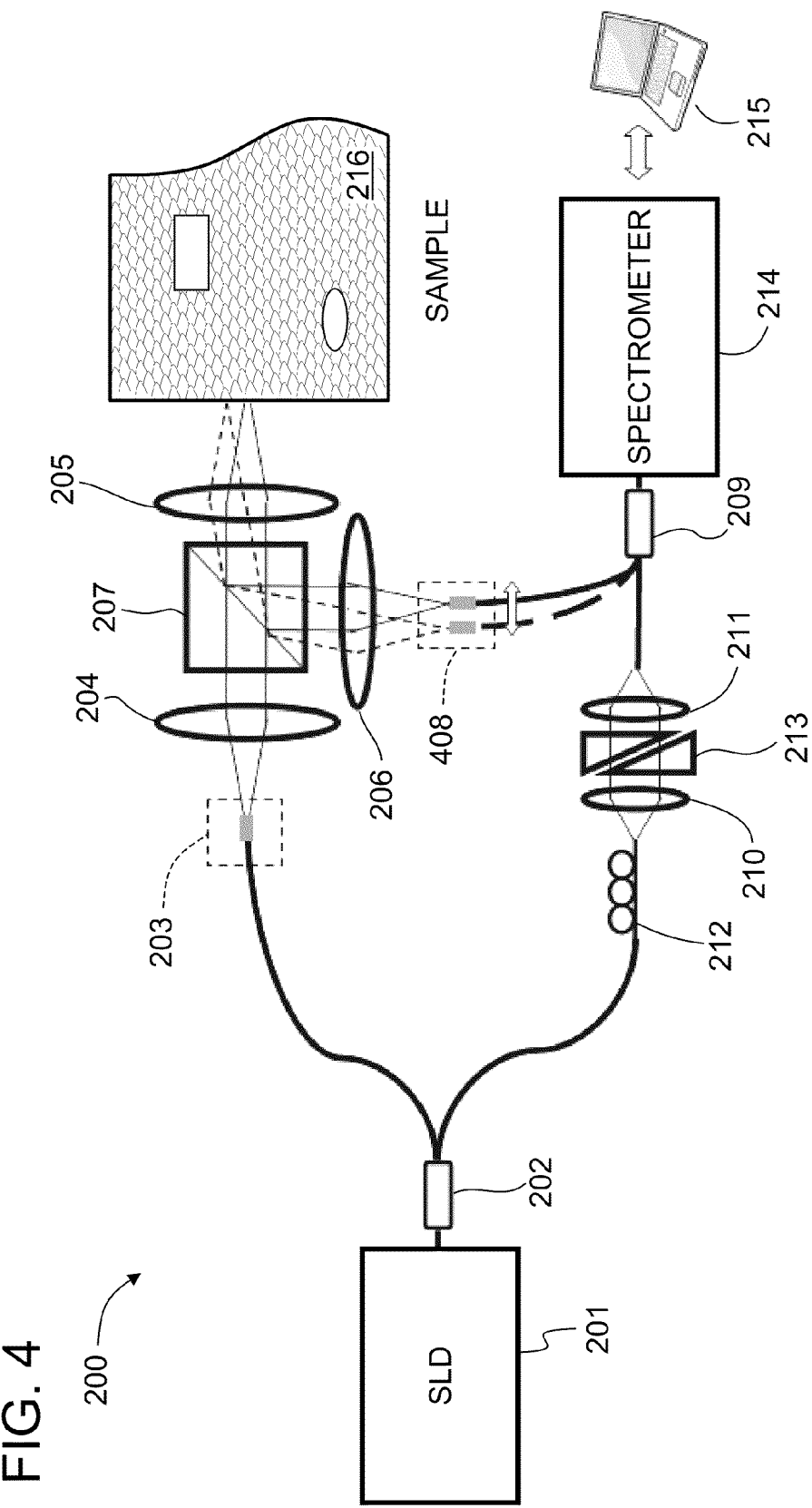
FIG. 4 illustrates a schematic diagram of a reflection-mode system measuring light reemitted from various locations on a sample according to embodiments of the present disclosure.

FIGS. 2-4 illustrate schematic diagrams of a reflection-mode system according to embodiments of the present disclosure. A low-coherence source 201, for example a broadband superluminescent diode (SLD), that, in embodiments, emits light with an approximately 10.0 micrometer (µm) scale coherence length (in embodiments, the coherence length can vary from approximately 1.0 µm to approximately 20.0 µm by using various light sources), is used to seed system 200. The light from the source 201 is coupled to a first optical fiber coupler 202, which splits a light into two portions. A first portion of the light, coming from a first fiber tip 203, is directed to a surface of sample 216 through a first imaging system. In embodiments, the first imaging system includes lenses 204 and 205. In embodiments, the first fiber tip 203 is mounted on a translation stage and can be scanned (e.g., moved) in an x-y plane to illuminate different locations on a surface of the sample 216 (see FIG. 3, 303). Alternatively, the light beam emitted from the fiber tip 203 can be scanned by other scanning mechanisms. The distance and direction of intended movement of the fiber tip 203 may be determined empirically based on past observed data, dynamically based on current data such as the sample size and orientation, or other means. In further embodiments, reemitted light is directed through lenses 205 and 206, and a beamsplitter 207. The reemitted light is then collected into a second fiber tip 208 of a second optical fiber coupler 209. In embodiments, the second fiber tip 208 is mounted on a translation stage and can be scanned (e.g., moved) in the y-z plane to record light reemitted from different locations on the sample 216 for each fixed illumination position (see FIG. 4, 408). For example, the fiber tip 203 and/or the fiber tip 208 may be moved manually and/or electronically (e.g., via actuators). Alternatively, the light reemitted from different locations on the sample 216 can be steered to be collected by the fiber tip 208 by other scanning mechanisms.

As mentioned above, the first optical fiber coupler 202 splits the light into two portions, the second portion of the light goes through a reference arm, which includes a second imaging system. The second imaging system includes lenses 210 and 211. In embodiments, the second imaging system is coupled into a second arm of the fiber coupler 209 to interfere with the reemitted light from the sample 216. In embodiments, in order to help separate the pathlength-resolved intensity from its conjugate counterpart, a length of the reference arm is usually adjusted to be slightly shorter than the pathlength of the first portion of light that interacts with the sample 216. In further embodiments, a polarization controller 212 and a dispersion compensator 213 are used to maximize interference efficiency. An interference signal is recorded by a high-resolution spectrometer 214 as a spectrum carrying a fringe pattern and acquired by a computer 215 for further processing. In embodiments, data acquisition and stage movement are also controlled by a computer. For a single combination of illumination and detection locations, reemitted light may be measured multiple times. In embodiments, for each illumination location, the reemitted light is measured at a plurality of locations. These measurements are repeated for multiple illumination locations.

Figure 5:
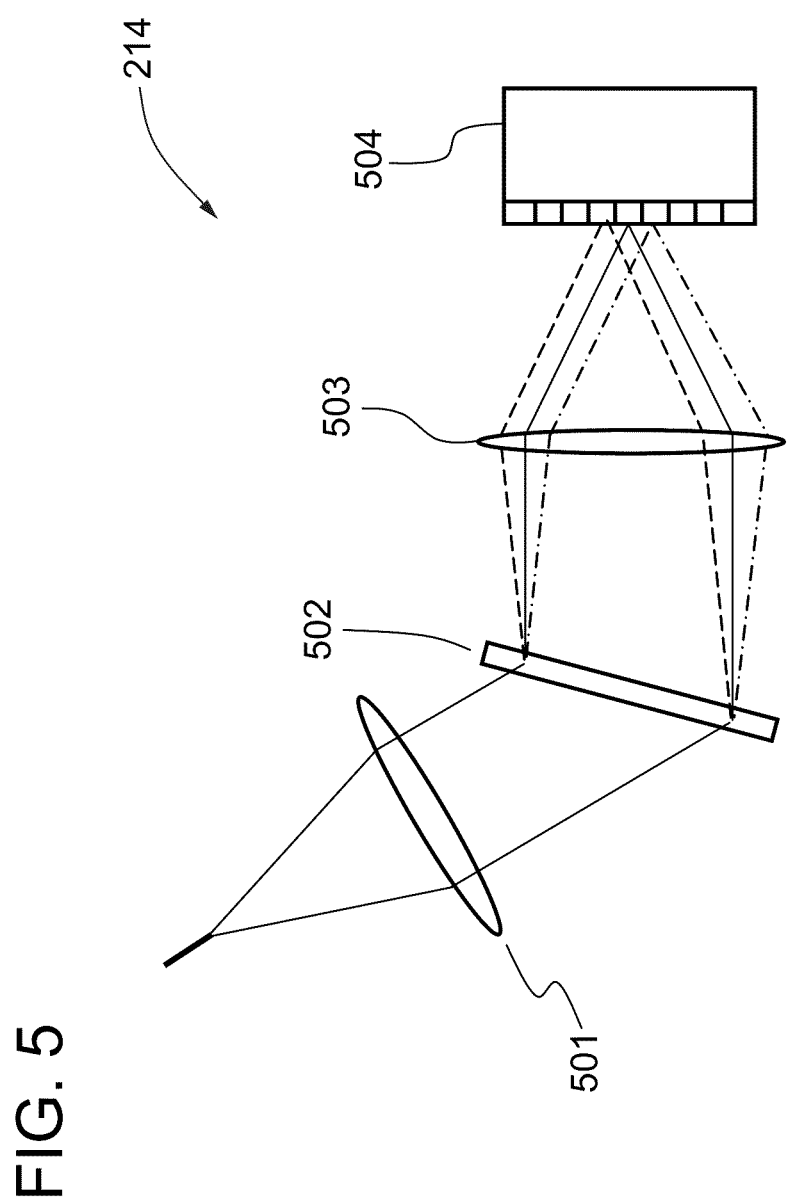
FIG. 5 illustrates a schematic diagram of a spectrometer according to embodiments of the present disclosure.

FIG. 5 illustrates a typical configuration of spectrometer 214 included in FIG. 2. The light coming from the fiber coupler 209 in FIG. 2 is first collimated by a lens 501, then dispersed by high-resolution grating 502, and imaged through a lens 503 by a line-scan camera 504.

An exemplary method that transforms an interference signal to a pathlength-resolved intensity curve will now be described. In embodiments, for reemission from $\vec{r}_d$ on a sample's surface while illumination is at $\vec{r}_s$, a recorded interference signal measured by a spectrometer $I(\vec{r}_s, \vec{r}_d, \lambda)$ is a function of wavelength $\lambda$. In embodiments, the recorded interference signal includes three components: 1) a power spectrum of a reference light $I_{ref}(\lambda)$, 2) a power spectrum of the reemitted light $I_{obj}(\vec{r}_s, \vec{r}_d, \lambda)$, and 3) a mutual coherence term between a reference light and reemitted light $I_{ro}(\vec{r}_s, \vec{r}_d, \lambda)$. In embodiments, $I_{ro}(\vec{r}_s, \vec{r}_d, \lambda)$ directly carries pathlength-resolved information about the reemitted light. To remove the other two terms, $I_{ref}(\lambda)$ can be separately measured by blocking an illumination to the sample at the beginning of each experiment, and $I_{obj}(\vec{r}_s, \vec{r}_d, \lambda)$ can be measured at each illumination-detection location pair by blocking a reference arm. In embodiments, all spectral-domain measurements $I(\vec{r}_s, \vec{r}_d, \lambda), I_{ref}(\lambda)$, and $I_{obj}(\vec{r}_s, \vec{r}_d, \lambda)$ are transformed to functions of wavenumber k with uniform sampling $I(\vec{r}_s, \vec{r}_d, k), I_{ref}(k)$, and $I_{obj}(\vec{r}_s, \vec{r}_d, k)$ by using the relation $\lambda=(2\pi/k)$ followed by an interpolation procedure. All measurements are then converted into a pathlength-resolved version $I(\vec{r}_s,$ $\vec{r}_d$, l), $I_{ref}$(l), and $I_{obj}$($\vec{r}_s$, $\vec{r}_d$, l) using Fourier transform between a pair of pathlength l and k. Multiple measurements taken with the same configuration are averaged after converting them into functions of l following the aforementioned steps. Finally, a pathlength-resolved reemission intensity can be calculated by neglecting a constant as:

$$T(\vec{r}_s, \vec{r}_d, l) = [I_{ro}(\vec{r}_s, \vec{r}_d, l)]^2 = [I(\vec{r}_s, \vec{r}_d, l) - I_{ref}(l) - I_{obj}(\vec{r}_s, \vec{r}_d, l)]^2 \quad (1)$$

According to photon transport theory, light propagation in a scattering medium is governed by a radiative transfer equation, which is given in the pathlength-dependent form as:

$$(\partial/\partial l - \hat{s} \cdot \nabla - (\mu_a + \mu_s))L(\vec{r}, \hat{s}, l) - \qquad (2)$$
$$\mu_s \int_{4\pi} L(\vec{r}, \hat{s}', l) P(\hat{s}' \cdot \hat{s}) d\Omega' = S(\vec{r}, \hat{s}, ct)$$

where $L(\vec{r}, \hat{s}, l)$ is a radiance at position $\vec{r}$ in direction $\hat{s}$ with a total traveling pathlength l after time zero. $\mu_a$, $\mu_s$, $\Omega'$ and c denote an absorption coefficient, a scattering coefficient, solid angle, and the speed of light, respectively. $P(\hat{s}' \cdot \hat{s})$ represents a scattering phase function, and S stands for a light-emitting source. As indicated in equation (2), the light reemitted after interaction with a medium carries information about key optical properties characterizing the medium, such as $\mu_a$, and $\mu_s$. To obtain a map of these optical properties in the medium from measurements of the reemitted light, a model-based reconstruction algorithm may be used, which includes: 1) a forward model, that numerically solves the radiative transfer equation, and computes expected measurements when a spatial distribution of these properties is given, and 2) an inverse procedure, which finds a distribution of these properties best fitting an experimental measurement.

As an example, to use measurements from the system 200 given in FIG. 2, the following description explains in detail how to form an image of a small absorbing object, such as an early stage tumor that possesses a high content of blood, hidden in a highly scattering medium. Different imaging problems can be solved by different choices of a forward model and an inverse procedure, and this exemplary embodiment does not limit the scope of the present disclosure. For example, the linear equations provided below are advantageous to use with an object that presents a small perturbation. Thus, if an object that presents a large perturbation, different model-based reconstruction algorithms may be applied, as describe in detail below.

For imaging a small embedded absorber, pathlength-resolved measurements of reemission around the medium may be taken with or without an absorbing object located therein, as $T(\vec{r}_s, \vec{r}_d, l)$ or $T_0(\vec{r}_s, \vec{r}_d, l)$. $\vec{r}_s$ and $\vec{r}_d$ are illumination and detection locations on a surface of the medium, respectively. In this embodiment, given that a lesion is small, a difference between two measurements $\Delta T(\vec{r}_s, \vec{r}_d, l) = T(\vec{r}_s, \vec{r}_d, l) - T_0(\vec{r}_s, \vec{r}_d, l)$ can be solved from equation (2) under a first-order Born approximation as:

$$\Delta T(\vec{r}_s, \vec{r}_d, l) = -\int_{\Omega_d} \int_V \int_{4\pi} \int_{l'} \hat{n}(\vec{r}_d) \cdot \hat{s}_d S(\vec{r}_s, \hat{s}_s, ct_s) \qquad (3)$$
$$G(\vec{r}, \hat{s}, l'; \vec{r}_s, \hat{s}_s, ct_s)$$

-continued
$$\Delta\mu_a(\vec{r}) G(\vec{r}_d, \hat{s}_d, l; \vec{r}, \hat{s}, l') dl' \, d\Omega \, dV \, d\Omega_d$$
$$= \int_V \Delta\mu_a(\vec{r}) \int_{\Omega_d} \int_{4\pi} \int_{l'} -\hat{n}(\vec{r}_d) \cdot \hat{s}_d S(\vec{r}_s, \hat{s}_s, ct_s) \qquad (4)$$
$$G(\vec{r}, \hat{s}, l'; \vec{r}_s, \hat{s}_s, ct_s)$$
$$G(\vec{r}_d, \hat{s}_d, l; \vec{r}, \hat{s}, l') dl' \, d\Omega \, d\Omega_d \, dV$$
$$= \int_V \Delta\mu_a(\vec{r}) J(\vec{r}; \vec{r}_s, \vec{r}_d, l) \, dV \qquad (5)$$

In this embodiment, $\Delta\mu_a$ represents an increase in absorption coefficient due to an existence of a tumor. $\hat{n}$ is an inward normal of the surface at $\vec{r}_d$, and G is a Green's function solution for equation (2). The integration involving S and G can be merged into a single function J, which links $\Delta\mu_a$ that we are seeking to image, with $\Delta T$ obtained from measurements. $J(\vec{r}; \vec{r}_s, \vec{r}_d, l)$ is often referred to as a sensitivity function, which physically means a rate of change in measurement $T(\vec{r}_s, \vec{r}_d, l)$ as a result of an absorbing perturbation at $\vec{r}$. A problem of imaging a small absorber can be simplified to solving an inverse problem of linear equations formulated in equation (5). Because of the discrete nature of the measurements, a forward model is usually described in the following matrix form as:

$$\Delta T = J \Delta\mu_a \qquad (6)$$

where $\Delta T$ is a vector representing change of an intensity profile, a function of $\vec{r}_s$, $\vec{r}_d$, and l, which, in embodiments, is directly calculated from two sets of experimental measurements, and has a total of N=(number of illumination-detection position pairs)×(number of pathlength segments) elements. $\Delta\mu_a$ is a vector representing an increase in an absorption coefficient in each space grid (e.g., voxel) of the media, and has a total of M=(number of voxels) elements. J is a discrete form of the sensitivity function times the volume of a voxel. It is an N×M matrix, and can be calculated by a numerical solver of the radiative transfer equation. The boundary conditions applied in experiments are taken into account in simulation. For example, we can use a time-resolved Monte Carlo simulator, which is derived from the method given in Wang, et al. "MCML-Monte Carlo modeling of photon transport in multi-layered tissues," *Computer Methods and Programs in Biomedicine* 47, 131-146 (1995) (hereinafter referred to as "the Monte Carlo method") with the following modifications: 1) track a pathlength of every photon packet during propagation, and record reemission at a detection surface into a matrix as a function both of position and pathlength, and 2) use an auxiliary matrix to record voxels centered at r, where scattering events occur for each photon packet and when this photon packet is reemitted from a detection surface, the remaining weight divided by $(\mu_a + \mu_s)$ is added to the element of a sensitivity matrix J corresponding to an illumination-detection position pair, pathlength and a voxel r.

Equation (6) can be inverted using a standard simultaneous iterative reconstruction algorithm given in a matrix form as:

$$\Delta\mu_a^{k+1} = (I - CJ^T RJ) \Delta\mu_a^k + CJ^T R \Delta T \qquad (7)$$

where k and k+1 are indices of iteration. $R = [r_{ij}]$ and $C = [c_{ij}]$ are diagonal matrices of an inverse of row and column sums of $J = [a_{ij}]$, respectively. That is, $r_{ii} = 1/\Sigma_j a_{ij}$ and $c_{jj} = 1/\Sigma_i a_{ij}$. In embodiments, the iterative inversion procedure begins with an initial assumption that $\Delta\mu_a^0 = 0$, and terminates when $\Sigma[(\Delta\mu_a^{k+1} - \Delta\mu_a^k)^2]\Sigma[(\Delta\mu_a^k)^2]$ falls below a certain preset threshold (for example, $10^{-6}$). In embodiments, matrices $(I-CJ^TRJ)$ and $CJ^TR\Delta T$ do not relate to a position or optical properties of a hidden absorbing object, thus they can be pre-calculated and stored as a database to significantly reduce computation time of reconstruction. In further embodiments, in order to make the reconstruction less susceptible to a boundary condition of an object, $M_0\Delta T/T_0$ instead of $\Delta T$ may be used for inversion, where $T_0$ and $M_0$ are measurements obtained through experiment and simulation without absorbing inclusion, respectively. Also, an obvious priori that $\Delta\mu_a$ is positive may be imposed during the iteration.

FIG. 6A shows reconstructed tomographic images of a 100 µm-diameter horse hair fiber that was immersed parallel to the y-axis inside a highly scattering tissue-mimicking medium at three different positions obtained according to the present disclosure. The achieved spatial resolution can be estimated to be better than 100 µm from a full width at half maximum of a spatial spread of the hair fiber. This resolution is maintained well throughout the imaged area. FIG. 6B shows a reconstructed image of two hair fibers in the same scattering medium with a 1.3 mm separation in both the x and z directions, which demonstrates that a system according to the present disclosure is capable of simultaneously mapping multiple absorbing perturbations located in close proximity.

Figure 7:
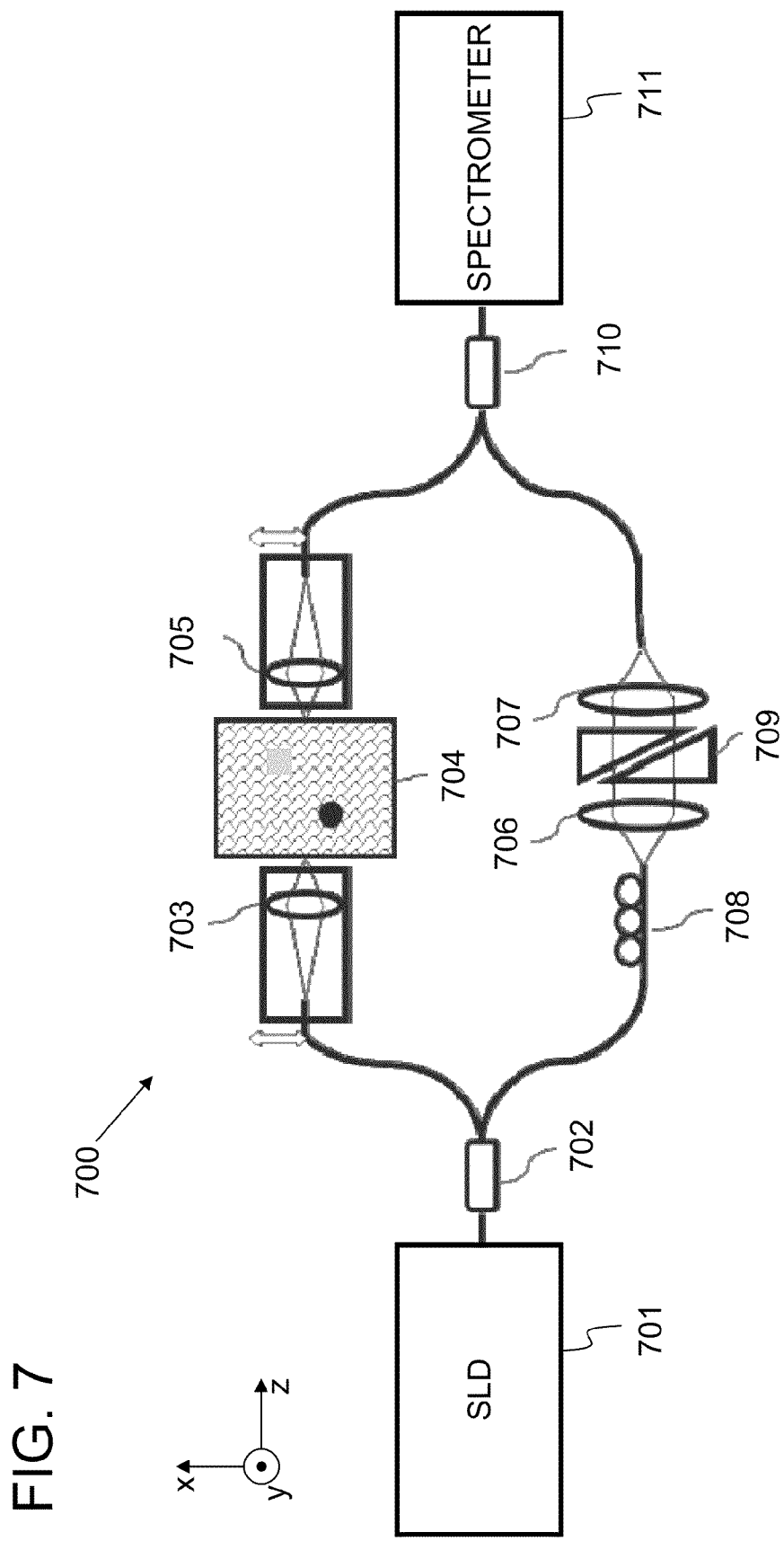
FIG. 7 illustrates a schematic diagram of a transmission-mode system according to embodiments of the present disclosure.

FIG. 7 illustrates a transmission-mode embodiment 700 according to the present disclosure. In this embodiment, low-coherence light from a light source 701, for example a superluminescent diode, is split by a first fiber coupler 702 into two portions. One portion of the low-coherence light is directed by a lens-based coupling system 703 to illuminate a surface of sample 704. Different from the embodiment in FIG. 2, reemitted light is collected from an opposing surface through another coupling system 705. The other portion of the low-coherence light from the light source 701 travels though a reference arm, which includes a first imaging system. In embodiments, the first imaging system includes lenses 706 and 707, a polarization controller 708, and a dispersion compensator 709. The low-coherence light coming from the reference arm and the reemitted light from the sample 704 are then mixed by a second fiber coupler 710 to produce an interference signal which can be recorded by a spectrometer 711. In embodiments, both illumination optics 703 and detection optics 705 are mounted on translation stages and can be scanned in a plane parallel to the surface of the sample 704 to take measurements through different illumination-detection position pairs. The recorded signal can be processed to form an image of the sample 704 following procedures similar to those given above. While the reflection-mode embodiment works well for imaging the near-surface region of a large volume of tissue, such as in the diagnosis of cutaneous melanoma and the study of brain cortex function in small animals, the transmission-mode embodiment is more suitable for achieving high-resolution whole-body imaging of small animals.

Figure 8:
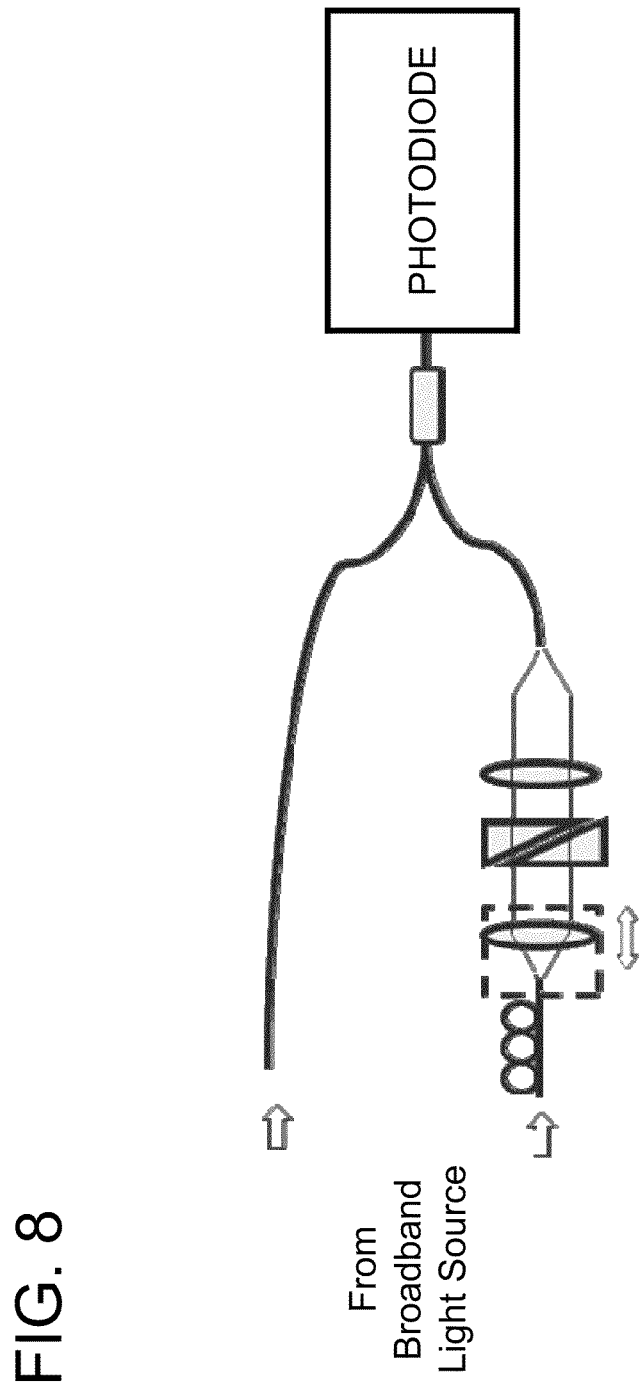
FIG. 8 illustrates a schematic diagram of an optical interferometer used in time-domain low-coherence interferometry according to embodiments of the present disclosure.
Figure 9:
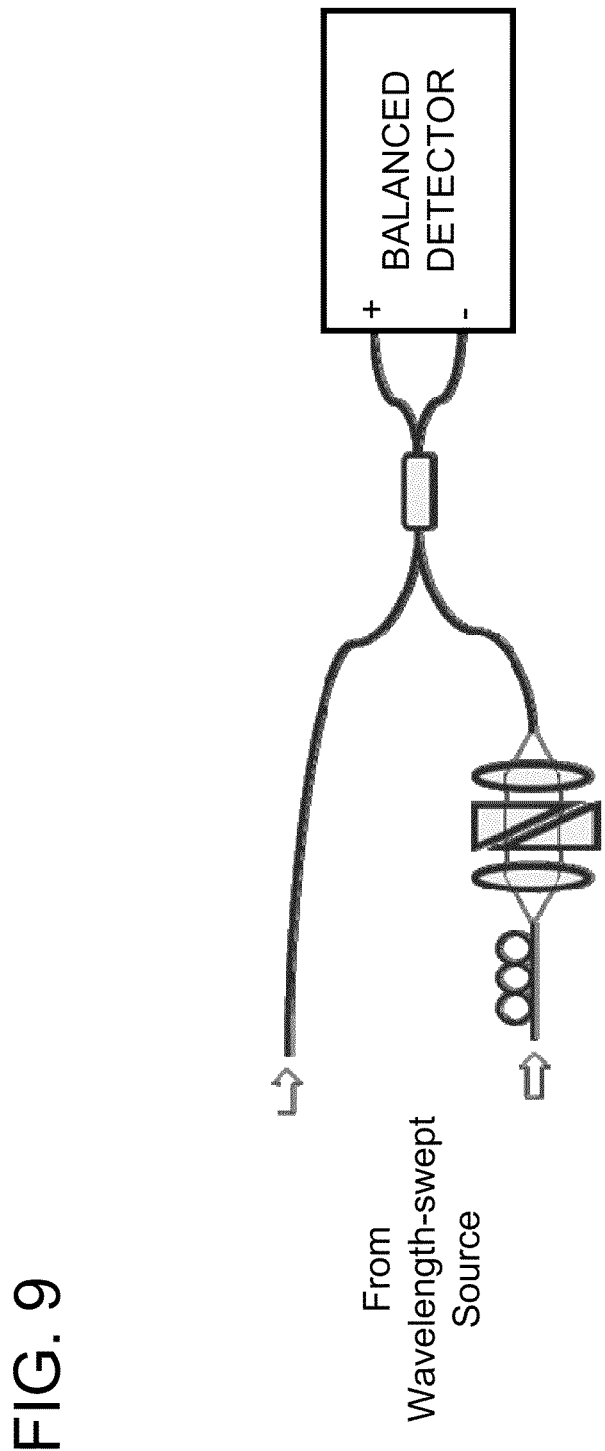
FIG. 9 illustrates a schematic diagram of an optical interferometer used in a frequency-domain low-coherence interferometry seeded by a wavelength-swept light source according to embodiments of the present disclosure.

Low-coherence interferometry of the present disclosure has many alternative realizations using different low-coherence sources and configurations of optical interferometers. Other broadband sources, such as a mode-locked Ti-Sapphire laser, can replace the superluminescent diode in the spectral-domain low-coherence interferometry shown in FIG. 2 and FIG. 7. An alternative time-domain embodiment of low-coherence interferometry consists of similar broadband sources with a different optical interferometer, as shown in FIG. 8. A length of a reference arm is periodically varied and a time-varying interference signal is recorded by a photodiode. Another frequency-domain set-up of low-coherence interferometry includes a wavelength-swept light source and a typical optical interferometer with a configuration shown in FIG. 9. The frequency-domain set-up of low-coherence interferometry is equivalent to the spectral-domain system, and the length of the reference arm is fixed during experiments. The difference is that spectra of the interference signal are generated by sequentially seeding the system with light with different wavelengths. At detection, the mixed light is usually divided equally between two ports of a balanced photodetector, where the unwanted background signal of a cross-interferogram is effectively removed.

Different model-based reconstruction algorithms may also be applied to solve different imaging problems. For example, if an object that presents a large absorbing or scattering perturbation is to be imaged, a forward model can not be simplified into a linear version, for example, as given in equation (5). In that embodiment, an image may be formed following an iterative process including five steps: 1) assume an initial distribution of optical properties; 2) predict a measurement using a fast solver of a radiative transfer equation; 3) calculate a prediction error compared to experimental measurements, check convergence, and if the error is sufficiently small, finish the reconstruction, otherwise, continue to the next step; 4) use an inverse procedure to calculate a change of optical properties according to residual error; and 5) update optical properties and return to step 2). Besides the Monte Carlo method, a fast solver for the radiative transfer equation can also be based on the discrete transfer method, the discrete ordinates method and finite volume method.

Figure 10:
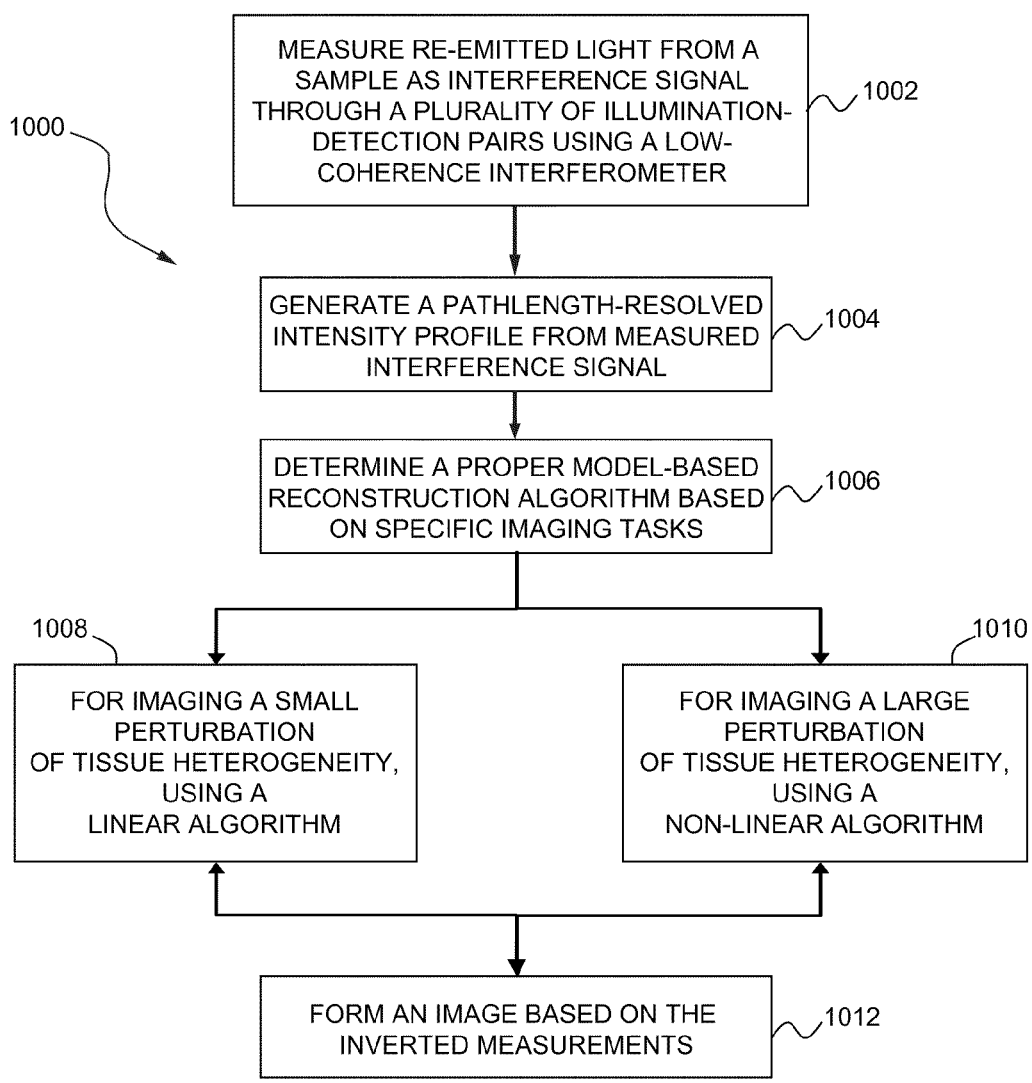
FIG. 10 is a flowchart that illustrates a method for forming an image using the embodiments of the present disclosure.

FIG. 10 is a flowchart 1000 that illustrates a method for forming an image using an optical coherence computed tomography device as described herein. In the exemplary embodiment, low-coherence interferometer 101 measures 1002 reemitted light from a sample as an interference signal through a plurality of illumination-detection pairs. More specifically, low-coherence light source 103 provides light with a short coherence length to seed low-coherence interferometer 101, and illumination probe 104 (shown in FIG. 1) delivers the light to the surface of sample 105. Detection probe 106 collects light that is reemitted from the surface of sample 105, and optical interferometer 107 (shown in FIG. 1) mixes a portion of the light from light source 103 with the reemitted light to generate the interference signal.

Image formation unit 102 (shown in FIG. 1) generates 1004 pathlength-resolved intensity profiles of the reemitted light from the sample based on the measured interference signals. Moreover, image formation unit 102 determines 1006 a proper type of model-based image reconstruction algorithm to use in generating an image of the tissue from the measured pathlength-resolved intensity profile. Specifically, for a small perturbation of tissue heterogeneity, image formation unit 102 inverts 1008 each measurements using a linear algorithm. Alternatively, for a large perturbation of tissue heterogeneity, image formation unit 102 inverts 1010 measurements using a non-linear algorithm. Finally, image formation unit 102 forms 1012 an image of sample 105 based on the inverted measurements.

Systems and methods according to the present disclosure can measure reemitted light with flexible pathlength resolutions either by employing various light sources with different coherence lengths or by using a sub-band of the full spectrum of a low-coherence source. In an embodiment, the pathlength resolution can be relaxed by utilizing a source with a coherence length longer than 1 cm. The diffused photons reemitted from a thick volume of tissue, such as the human breast, can be measured as a pathlength-resolved profile. The optical properties of the medium can be mapped using a reconstruction based on the diffusion equation (the approximated form of the radiative transfer equation with diffusion approximations), which is extensively studied in the field of diffuse optical tomography, but is much cheaper to implement.

Exemplary Operating Environment

A computing device such as a computer has one or more processors or processing units and a system memory. Although described in connection with an exemplary computing system environment, embodiments of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical coherence computed tomography device, comprising:
   a light source;
   a first optical fiber coupler configured to split a light into a first light and a second light, the second light going through a reference arm;
   a first fiber tip configured to direct the first light to a surface of a sample, wherein the first fiber tip is further configured to be scanned to illuminate different locations on a surface of the sample;
   a second optical fiber coupler configured to collect reemitted light; and
   a second fiber tip configured to be scanned to measure light reemitted from the different locations on the surface of the sample, wherein the first fiber tip and the second fiber tip are mounted on translation stages;
   wherein the measurement is inverted to form an image.

2. The optical coherence computed tomography device according to claim 1, wherein the light source is a broadband superluminescent diode.

3. The optical coherence computed tomography device according to claim 1, wherein the light source is a mode-locked Ti-Sapphire laser.

4. The optical coherence computed tomography device according to claim 1, wherein the light source is a wavelength-swept laser.

5. The optical coherence computed tomography device according to claim 1, further comprising a first imaging system configured to direct the first light from the first fiber tip to the sample.

6. The optical coherence computed tomography device according to claim 1, wherein the reference arm includes a second imaging system.

7. The optical coherence computed tomography device according to claim 6, wherein the second imaging system is coupled to a second arm of the second optical fiber coupler.

8. The optical coherence computed tomography device according to claim 6, wherein the second imaging system is configured to direct a portion of light from the source to interfere with the reemitted light from the sample.

* * * * *